United States Patent
Salmon et al.

(10) Patent No.: US 7,506,716 B1
(45) Date of Patent: Mar. 24, 2009

(54) PEDESTRIAN PROTECTION AUTOMOTIVE HOOD HINGE ASSEMBLY

(75) Inventors: John Salmon, Toronto (CA); Kevin Crowder, Ipswich (GB)

(73) Assignee: Multimatic Inc., Markham, Ontario (CA)

( * ) Notice: Subject to any disclaimer, the term of this patent is extended or adjusted under 35 U.S.C. 154(b) by 0 days.

(21) Appl. No.: 12/065,675

(22) PCT Filed: Jul. 18, 2006

(86) PCT No.: PCT/CA2006/001174
§ 371 (c)(1),
(2), (4) Date: Mar. 4, 2008

(87) PCT Pub. No.: WO2007/028229
PCT Pub. Date: Mar. 15, 2007

(30) Foreign Application Priority Data
Sep. 9, 2005  (CA) .................................... 2518682

(51) Int. Cl.
*B60K 28/10* (2006.01)
(52) U.S. Cl. .................. 180/274; 180/281; 296/187.04; 296/193.11
(58) Field of Classification Search ................. 180/274, 180/271, 281; 296/189, 194
See application file for complete search history.

(56) References Cited

U.S. PATENT DOCUMENTS

| | | | |
|---|---|---|---|
| 6,182,782 B1* | 2/2001 | Matsuura et al. ............ | 180/274 |
| 6,217,108 B1* | 4/2001 | Sasaki .................... | 296/187.09 |
| 6,345,679 B1* | 2/2002 | Sasaki ........................ | 180/274 |
| 6,439,330 B1 | 8/2002 | Paye | |
| 6,442,801 B1* | 9/2002 | Kim ............................ | 16/361 |
| 6,513,617 B2* | 2/2003 | Sasaki et al. ................. | 180/274 |
| 6,554,093 B2* | 4/2003 | Sasaki et al. ................. | 180/274 |
| 6,668,962 B2* | 12/2003 | Son ............................ | 180/274 |
| 6,755,268 B1* | 6/2004 | Polz et al. ................. | 180/69.21 |
| 6,834,735 B2* | 12/2004 | Kim ......................... | 180/69.21 |
| 7,000,720 B2* | 2/2006 | Polz et al. ................. | 180/69.21 |
| 7,410,027 B2* | 8/2008 | Howard ...................... | 180/274 |
| 2004/0134705 A1 | 7/2004 | Nadeau et al. | |
| 2005/0151393 A1 | 7/2005 | Borg et al. | |

FOREIGN PATENT DOCUMENTS

| | | |
|---|---|---|
| DE | 10116716 A1 | 10/2002 |
| EP | 1295762 B1 | 3/2003 |
| JP | 2005254833 | 9/2005 |

* cited by examiner

*Primary Examiner*—Toan C To
(74) *Attorney, Agent, or Firm*—Fredrikson & Byron, P.A.

(57) ABSTRACT

An automotive hood hinge assembly is adapted to act as a safety device in the event of a collision with a pedestrian. The hood hinge assembly is constructed from a series of linkages and an energy storage actuator that is configured to raise the rear of a vehicle hood in response to a pedestrian collision. The deployed system forms a rigid structure that restrains rearward movement of the hood while providing a vertical motion path and resistive force capable of efficiently dissipating the energy imparted by the pedestrian and therefore significantly lowering injury levels. The linkages are configured to provide conventional rotary opening and closing motion of the hood when the system is in the retracted position and also provide a reset function so that a simple opening and closing motion of the hood when the system is in the deployed position resets it to the retracted position.

14 Claims, 10 Drawing Sheets

PEDESTRIAN PROTECTION AUTOMOTIVE HOOD HINGE ASSEMBLY

RELATED APPLICATIONS

This application claims priority to International Application No. PCT/CA2006/001174 filed Jul. 18, 2006 and to Canadian Patent Application No. 2,518,682 filed Sep. 9, 2005, the teachings of which are incorporated herein by reference.

FIELD OF THE INVENTION

This invention applies to hinges, more particularly to automotive hood hinges adapted to act as a safety device in the event of a collision with a pedestrian.

DESCRIPTION OF THE PRIOR ART

The forward most closure panel of a vehicle is generally referred to as the hood and it is arranged in a substantially horizontal orientation to enclose, and also to allow hinged access to, the engine compartment. It has been established that in the case of a vehicle to pedestrian collision, the highest risk of serious upper body and head injury occurs due to the pedestrian being thrown onto the relatively unyielding hood and windshield of the vehicle. It has also been proven that by providing a deformable structure in the area of where the pedestrian's upper torso and head impact the hood, an effective energy dissipation mechanism can be created which reduces head and chest decelerations and leads to significantly lower injury levels.

One of the earliest vehicle hood related technologies associated with pedestrian protection is described in U.S. Pat. No. 4,249,632 which claims a safety device mechanism that lifts the rear of the hood in response to a pedestrian collision. Sensors, arranged in the area of the front bumper, send a trigger signal to the mechanism which raises the rear of the hood from its rest position. The advantage of the system is that it creates a deformation path, with favorable energy dissipation characteristics in the impact area of the head and upper body. The device also prevents the head of the pedestrian from striking the windshield and its frame. Although this early prior art provided a technology for raising the rear of the hood it does not specifically claim a solution for providing the appropriate energy absorbing stiffness for the pedestrian or an adequate mechanism for latching, hinging and retaining the rear of the hood in both its rest and deployed positions. It also fails to describe any method of resetting the system after deployment.

More recently it has been established that some 60-80 mm of vertical hood movement is required to effectively attenuate the pedestrian's energy to avoid significant upper body and head trauma. Additionally, a significant and controlled resistive force is required through the entire vertical movement in order to decelerate the pedestrian at the appropriate rate. Finally, some form of mechanism is required to assure that the vertical hood movement and imparted load are controlled in the required manner.

U.S. Pat. No. 6,439,330 describes a device for raising the rear of the hood of a vehicle using a pyrotechnically powered actuator. The device consists of a single pivot hood hinge that includes an arm that engages with a guide track and is normally oriented so that the hinge operates in a conventional manner. In case of a collision with a pedestrian the pyrotechnically powered actuator extends the hinge arm in the guide track which causes the trailing edge of the hood to move upwardly into a deployed position. Although this device overcomes some of the limitations of U.S. Pat. No. 4,249,632 by incorporating an adequate mechanism for latching, hinging and retaining the rear of the hood in its rest position, it does not provide a method of stabilizing or guiding the hood once it is in its deployed position. With no structural restraint in the raised position, there is a significant risk of the hood being driven rearward through the windshield and injuring the vehicle occupants in the case of substantial frontal impact. Additionally, this prior art embodiment does not claim any method for providing a resistive force to dissipate the energy imparted by the pedestrian.

One embodiment of a lifting device that does provide a resistive force once the rear of the hood is raised is described in U.S. Pat. No. 6,415,882. This device incorporates a single pivot pin that is secured to a vehicle body and engages a slot in a hinge that is attached to the hood. A powered deployment cylinder is activated by a pedestrian impact detection system and the hood hinge pivot pin is driven down in the slot. The pivot pin contains two diameters, one of which is larger than the slot width and engages the slot when the hood is fully raised. The energy of the pedestrian impact is dissipated by the large diameter of the pin deforming the material adjacent to the slot. Although this prior art embodiment does provide a resistive force to dissipate the energy imparted by a pedestrian, the material deformation method described would be highly inefficient, requiring significant space beyond that available. Additionally, this configuration does not claim a robust method of stabilizing or guiding the hood once it is in its deployed position and therefore suffers the same limitations as U.S. Pat. No. 6,439,330 when the hood is raised. Finally, both U.S. Pat. No. 6,415,882 and U.S. Pat. No. 6,439,330 fail to describe any method of resetting the system after deployment.

U.S. Pat. No. 6,345,679 describes a further embodiment of a pedestrian protection hinge that lifts the rear edge of the hood of a vehicle using an actuator in response to a pedestrian collision. This patent describes a multi-link hood hinge arrangement that provides a single pivot configuration for conventional operation and an adequate mechanism for latching, hinging and retaining the rear of the hood in its rest position as well as a robust method of guiding the hood into its deployed position. Additionally, the linkage system is configured to restrict the rearward movement of the hood in its raised position thereby preventing any potential contact with the windshield. A methodology for resetting the system after deployment is also provided but this aspect utilizes an additional actuator cylinder which is complex and would add significant cost and weight. Although this prior art overcomes many of the structural concerns of the previously described configurations it is not specifically configured to provide a resistive force to dissipate the energy imparted by the pedestrian and the resetting arrangement is overly complex.

GENERAL DESCRIPTION OF THE INVENTION

Accordingly, it would be advantageous to create a hinge assembly which facilitates conventional opening and closing operation of a vehicle hood while also providing a controlled motion of the rear of the hood into a raised position in response to a pedestrian collision. Additionally, it would be a significant improvement over the existing art if the hinge assembly tightly controlled the motion of the raised hood to a predetermined, generally vertical motion, structurally restrained the system in a horizontal direction and provided a tunable resistive force to dissipate the energy imparted by the pedestrian. Another major advantage would be realized if the hinge assembly provided a simple method for allowing the vehicle operator to reset the system into its normal operating position.

The present invention provides a hood binge assembly mounted at the rear of a vehicle hood and configured to raise the rear of the hood in response to a pedestrian collision using an energy storage actuator and a series of linkages. For conventional opening and closing operation, these linkages are constrained, by means of a latch within the energy storage actuator, to simple rotary motion of the hood relative to the vehicle. If a pedestrian collision is sensed, then the latch is released and the energy storage actuator is allowed to extend and deploy the linkage system which is configured to constrain the motion of the rear edge of the hood to a predetermined path that is substantially vertical. The vehicle hood is allowed some limited freedom to rotate about a forward pivot point which is preferably formed from the conventional front mounted hood catch. Once deployed, the linkages and extended energy storage actuator form a rigid structure that restrains rearward movement of the hood while still providing a vertical motion path and resistive force as required to efficiently dissipate the energy imparted by the pedestrian. The energy storage actuator is rotatably attached to the linkage system and provides both the energy required to deploy the system and the required resistive force to attenuate the pedestrian acceleration. The energy storage device can be a gas spring, a coil spring or other similar device. Finally, the linkage system is also configured so that when it is in the deployed position, a simple opening and closing motion of the hood around the conventional rotary pivot resets the system into the latched condition.

Accordingly, in a principal aspect of the present invention, a hood hinge assembly for a vehicle is configured to facilitate conventional opening and closing operation of a hood via a single pivot axis provided between a hood component and a main link component. The main link component is configured with four rotatable joints located respectively at its free end, at a point adjacent to its free end, at its anchored end and at an intermediate point located between its free and anchored ends. The hood component is rigidly attached to the hood and rotatably attached to the main link component at its free end joint. The main link component is constrained at its anchored end by a slot mounted to the vehicle body and by a control link that is rotatably mounted between the vehicle body and the intermediate joint of the main link. Additionally, a moving element of an energy storage actuator is rotatably mounted to the main link at the joint adjacent its free end and the main body of the energy storage actuator is mounted to the vehicle body. In the normal opening and closing operating condition of the system, the energy storage actuator is latched in a retracted position so that the main link component is held in a substantially horizontal fixed position creating a simple two component, single pivot, hood hinge arrangement.

In the event of a collision with a pedestrian, a conventional sensor and control system as described in U.S. Pat. No. 4,249,632 and U.S. Pat. No. 6,332,115 provide a trigger signal to the energy storage actuator which releases the latch and deploys the moving element by a predetermined linear displacement. As the main link component is attached to the moving element of the energy storage actuator at the joint adjacent to its free end, the rear of the hood is therefore translated by the predetermined linear displacement. The movement of the main link is dictated by the linear motion of its anchored end in the slot and by the rotation of the control link. By tuning the orientation of the slot and the configuration of the control link, the motion of the rear of the hood can be accurately tailored to be compatible with the vehicle geometry and front mounted hood catch.

When a pedestrian's head and upper body strike the raised hood, the deployed energy storage device provides a resistive force capable of effectively dissipating the pedestrian's energy in a controlled manner so that trauma levels are significantly lowered. The resistive force of the energy storage device is tuned during development and preset and the motion of its moving element is the reverse of deployment as determined by the geometry of the linkage system. This motion path is a critical aspect of the energy dissipation capability of the system. A primary advantage of the present invention over the prior art is that the linkage system provides an extremely rigid structure in all degrees of freedom except the predetermined motion path required for pedestrian energy dissipation. As the predetermined motion path is in a generally vertical direction, this rigid structure is capable of restraining the hood from moving rearward in the case of a severe frontal impact. The rigid structure of the present invention therefore prevents the hood from being driven back through the windshield and allows the hood to buckle at a predetermined initiation point as intended during normal, non-deployed operation.

In an additional preferred embodiment of the present invention, a reset linkage is provided that allows the vehicle operator to compress and relatch the energy storage device in case of accidental deployment due to a collision with an inanimate object such as a refuse container. The reset linkage is constructed from two links, each configured with two rotatable end joints. The first reset link is rotatably attached to the vehicle body at its first end joint and is also rotatably attached to the second reset link at its second end joint. The remaining end joint of the second link is rotatably attached to the hood component at an offset position from the pivot axis joint.

In conventional opening and closing operation of the hood, the reset linkage moves in a totally passive manner and does not affect the motion of the system. Similarly, during deployment of the moving element of the energy storage actuator in the event of a collision with a pedestrian, the reset linkage articulates in a totally passive manner and does not affect the motion of the system. The reset linkage does affect the motion of the hinge assembly when the moving element of the energy storage actuator is in its deployed position and the rear of the hood is therefore raised, and an operator rotates the hood of the vehicle from a front edge closed to front edge fully open position. In this case, the reset links are forced into axial alignment which causes them to act as a tension member and forces the moving element of the energy storage actuator to be compressed back into its retracted position so that it relatches. This motion is similar to the conventional opening and closing operation of the hood but it is undertaken when the moving element of the energy storage actuator is in its deployed position. This provides the vehicle operator with a simple and intuitive method of resetting the system after deployment. In an alternative embodiment of the reset linkage, a single flexible cable is rotatably attached to the vehicle body and the hood component at an offset position from the pivot axis joint. This cable replaces the two reset links but operates in an identical manner.

Accordingly, the hood is fully closed with the hinge in a retracted position prior to a collision with a pedestrian. At the moment of collision, the sensors and control system activate the hinge so that it is deployed to allow the rear of the hood to rise, while the hood remains closed. Thereafter, when the motorist rotates the hood from fully closed to fully open, the hinge system resets to the retracted position so that the hood can be closed and latched in its normal pre-collision, position.

Further aspects of the invention will become apparent from the following description.

DETAILED DESCRIPTION OF THE INVENTION

Figure 1:
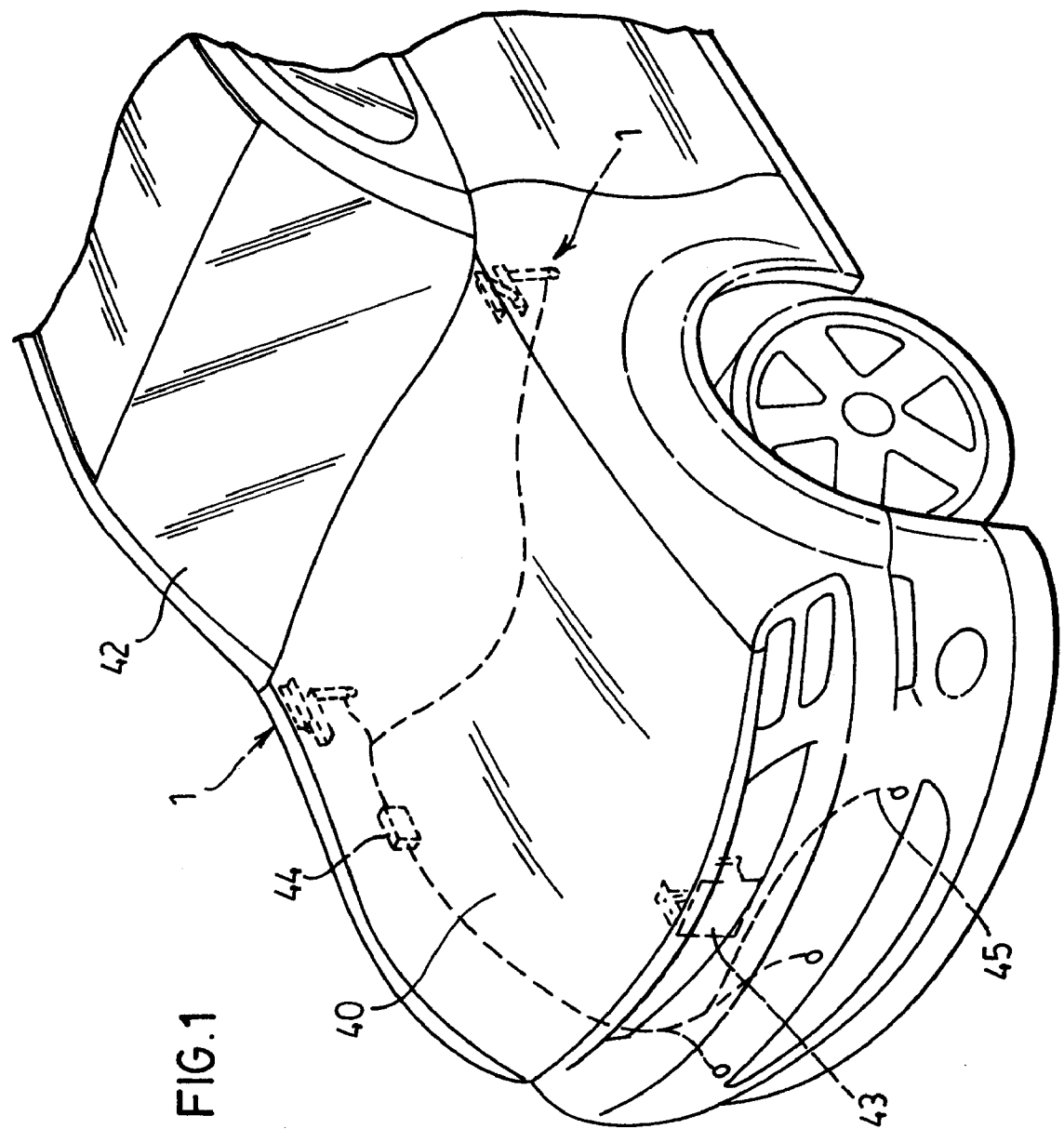
FIG. 1 is a perspective view of a pair of the inventive hood hinge assemblies in a typical automotive installation.

Referring to FIGS. 1, 2, 3 and 4, a hood hinge assembly (1) is substantially constructed from a hood component (2), a main link component (3) and a body component (4). The hood component (2) is configured with a main pivot joint (20) and is rigidly attached to a vehicle hood (40) using bolting, welding, bonding or similar fastening means. The body component (4) is configured with an anchor slot (30) and an anchor pivot joint (21) and is rigidly attached to a vehicle body (41) using bolting, welding, bonding or similar fastening means, The main link component (3) is adapted to be rotatably attached to the hood component (2) at its main pivot joint (20) via a main bushing (50) and main rivet (51) or similar means. The main link component (3) is also configured with an anchor end joint (22) that is adapted to be constrained by the anchor slot (30) of the body component (4) via a sliding rivet (52) and sliding bushing (53) or similar means. A control link (5) is adapted to be rotatably attached to the body component (4) at the anchor pivot joint (21) via a bushing (54) and rivet (55) or similar means. The control link (5) is additionally rotatably attached to the main link component (3) at an intermediate pivot joint (23) via a bushing (56) and rivet (57) or similar means. A moving element (6) of an energy storage actuator (7) is rotatably attached to the main link component (3) at an actuator pivot joint (24) adjacent the main pivot joint (20) via a bushing (58) and rivet (59) or similar means. The energy storage actuator (7) is rotatably attached to the vehicle body (41) at an actuator anchor joint (25) via a bushing (60) and rivet (61) or similar means.

Figure 5:
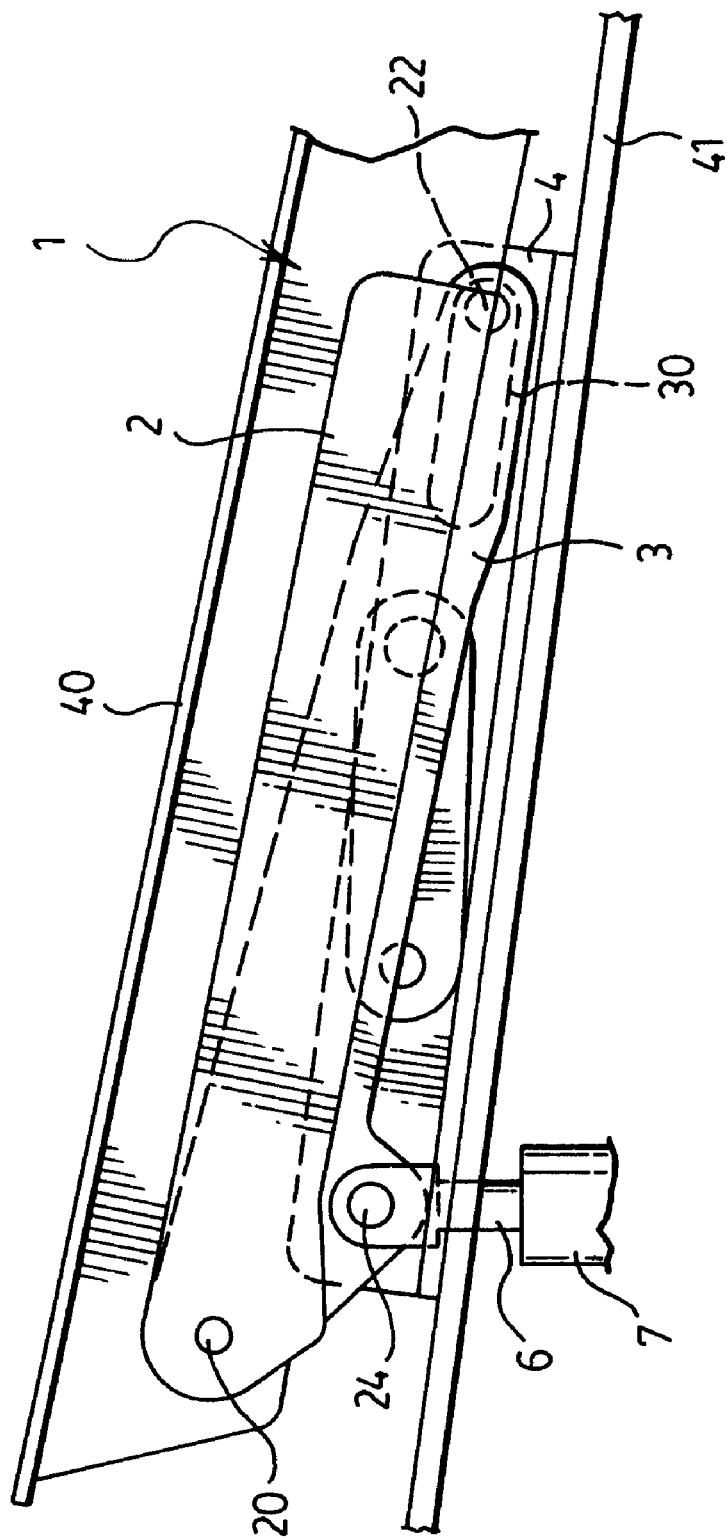
FIG. 5 is a side view of one embodiment of the inventive hood hinge assembly in a retracted position facilitating conventional hood operation.

Referring to FIG. 5, when the moving element (6) of the energy storage actuator (7) is latched in its retracted position, the main link component (3) is rigidly restrained in a substantially horizontal position via the anchor end joint (22) being held in the anchor slot (30) and the actuator pivot joint (24) being held by the latched moving element (6). In this condition, the hood hinge assembly (1) operates as a single pivot configuration and facilitates conventional rotary opening and closing operation of the vehicle hood (40) relative to the vehicle body (41) via the main pivot joint (20).

Referring to FIGS. 1, 2, 3 and 6, in the event of a collision with a pedestrian, a conventional sensor (45) and control system (44) as described in the prior art provide a trigger signal to the energy storage actuator (7) which releases an internal latch and deploys the moving element (6) by a predetermined linear displacement. As the main link component (3) is rotatably attached to the moving element (6) at the actuator pivot joint (24) and the hood component (2) is rotatably attached to the main link component (3) at the main pivot joint (20), the hood component (2) is therefore translated by the predetermined linear displacement of the moving element (6).

The overall motion of the main link component (3) and its main pivot joint (20) is constrained by the linear motion of its anchor end joint (22) in the anchor slot (30) and by the rotation of the control link (5). By tuning the orientation of the anchor slot (30) and the configuration of the control link (5) via the location of the anchor pivot joint (21) and intermediate pivot joint (23), the motion of the main pivot joint (20), the hood component (2) and the rear of the vehicle hood (40) can be accurately tailored to the vehicle configuration. Although this motion is substantially vertical, it can be adapted to follow a path that is compatible with the front mounted hood catch (43) that is located at the front of the vehicle hood (40) or can be tailored to the optimal motion required to dissipate the energy of an impacting pedestrian.

Figure 2:
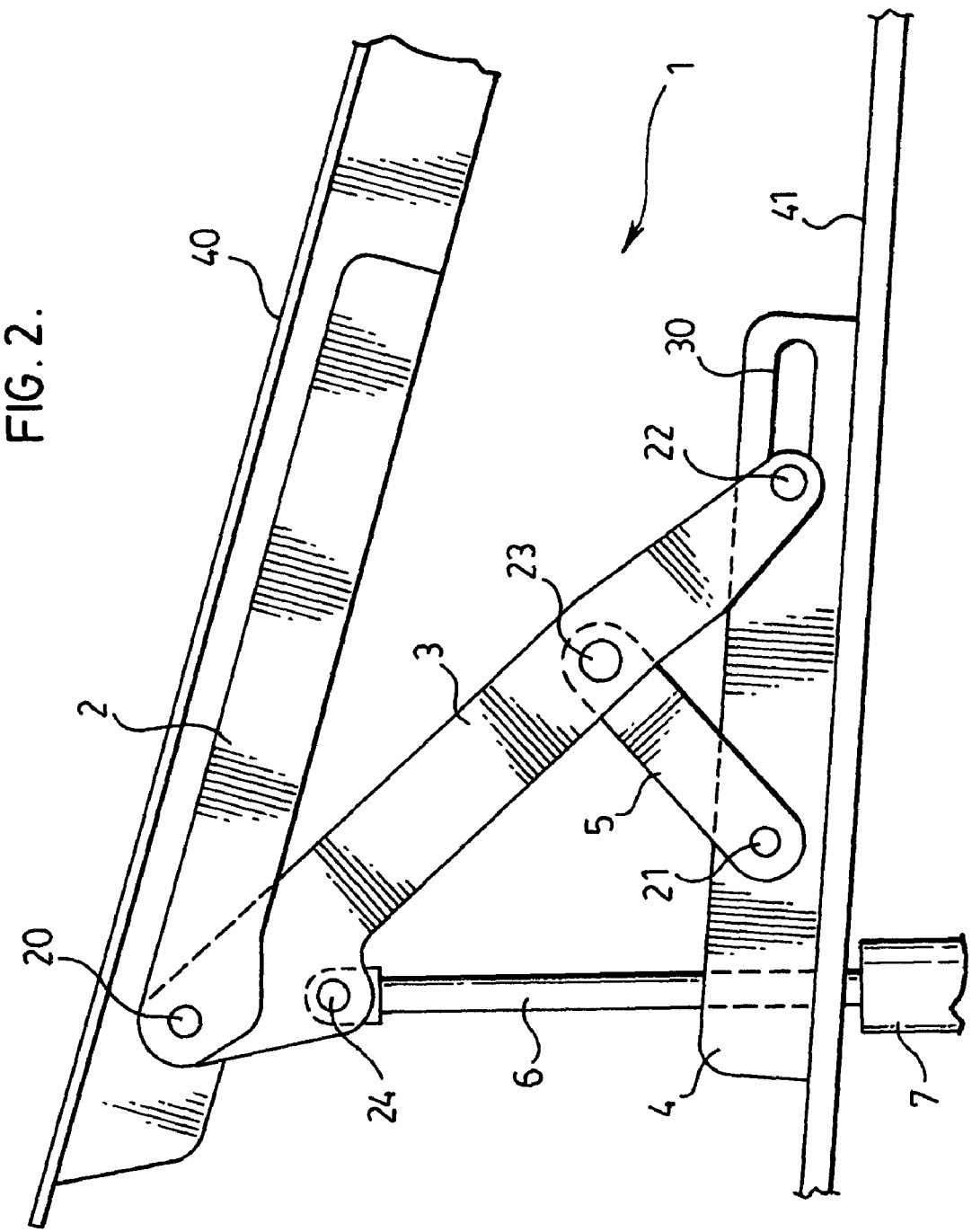
FIG. 2 is a side view of one embodiment of the inventive hood hinge assembly in a fully deployed position due to a pedestrian collision.
Figure 6:
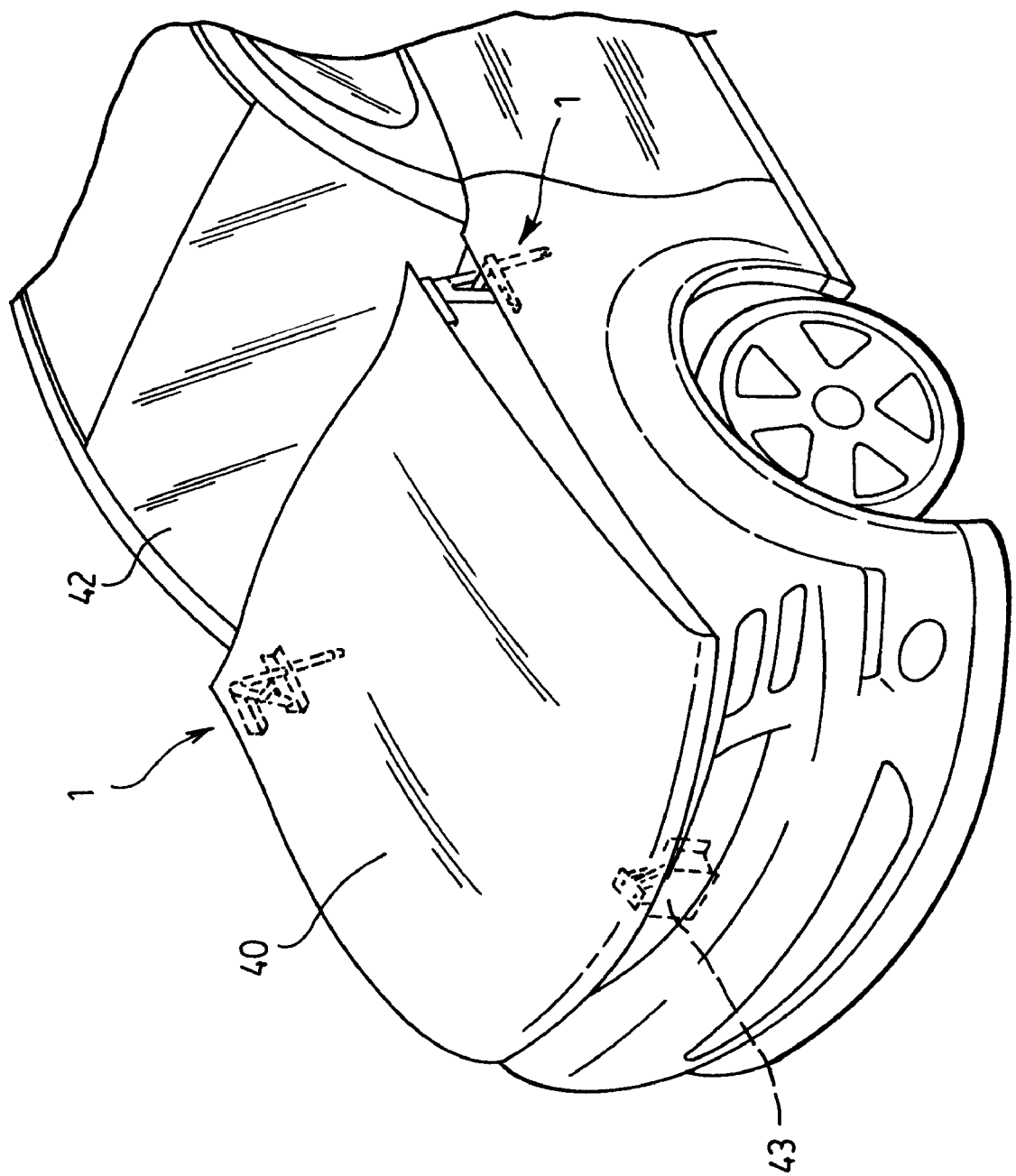
FIG. 6 is a perspective view of a pair of the inventive hood hinge assemblies in a fully deployed position due to a pedestrian collision in a typical automotive installation.
Figure 9:
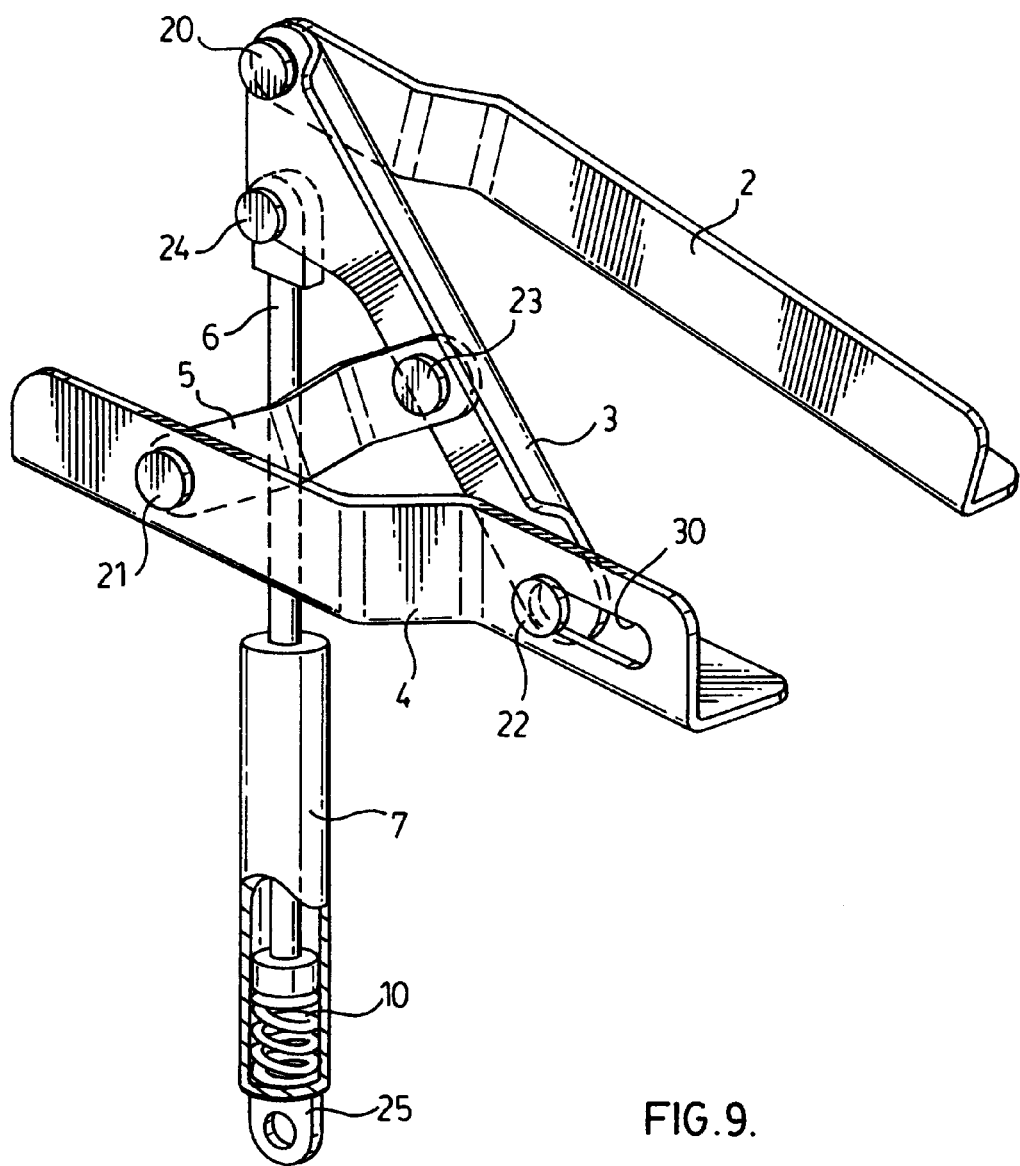
FIG. 9 is a perspective view of an alternative embodiment of the inventive hood hinge assembly in a fully deployed position due to a pedestrian collision.

Referring to FIGS. 2 and 6, when a pedestrian's head and upper body strike the raised vehicle hood (40), the deployed energy storage actuator (7) provides a resistive force capable of effectively dissipating the pedestrian's energy in a controlled manner so that trauma levels are significantly lowered. The resistive force of the energy storage device is preset and the motion of the rear of the vehicle hood (40) is the reverse of deployment as determined by the geometry of hood hinge assembly (1). This motion path is an important aspect of the energy dissipation capability of the system. The energy storage device can be a gas spring or, as illustrated in FIG. 9, a coil spring (10) or other similar device.

Figure 3:
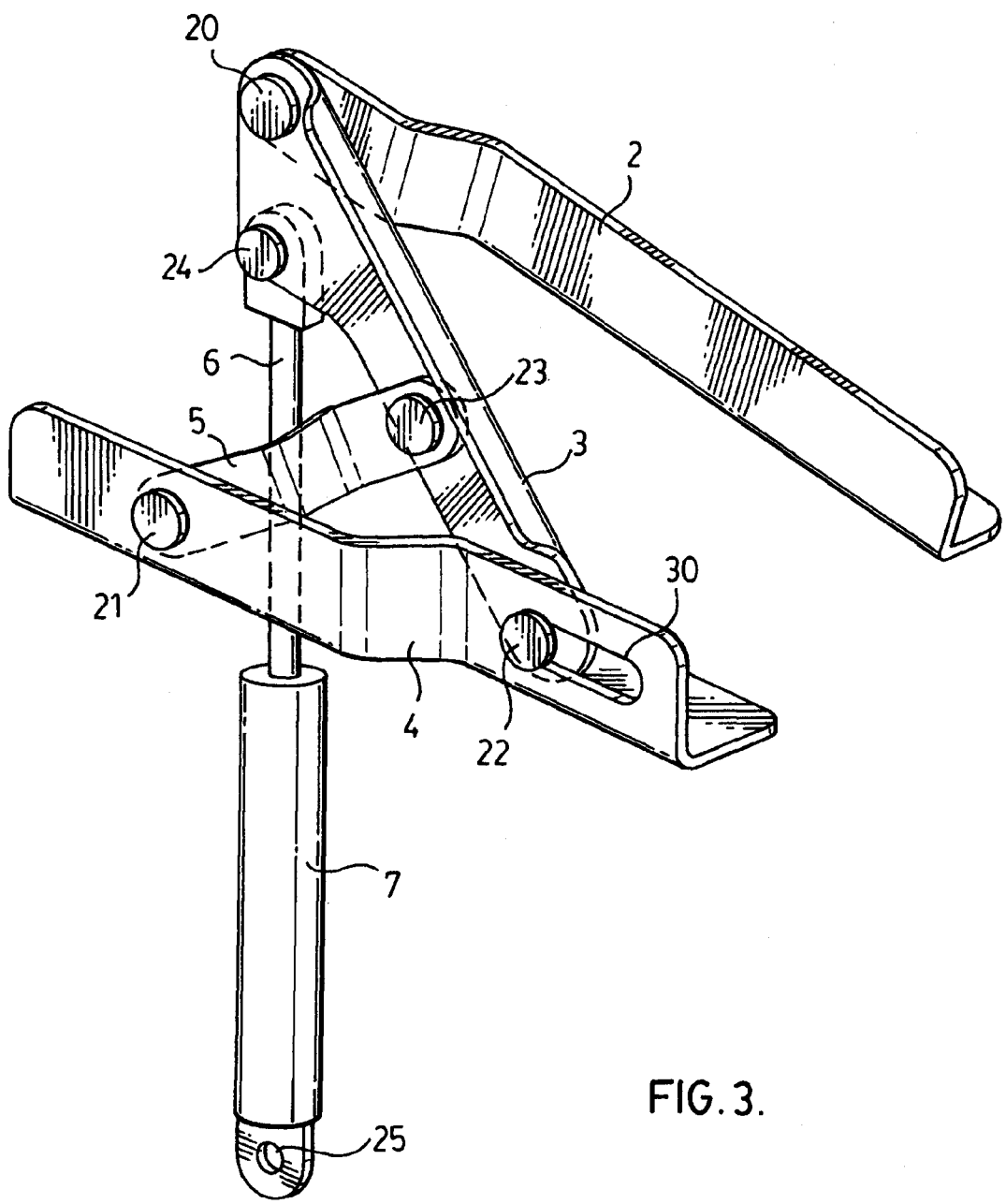
FIG. 3 is a perspective view of one embodiment of the inventive hood hinge assembly in a fully deployed position due to a pedestrian collision.
Figure 4:
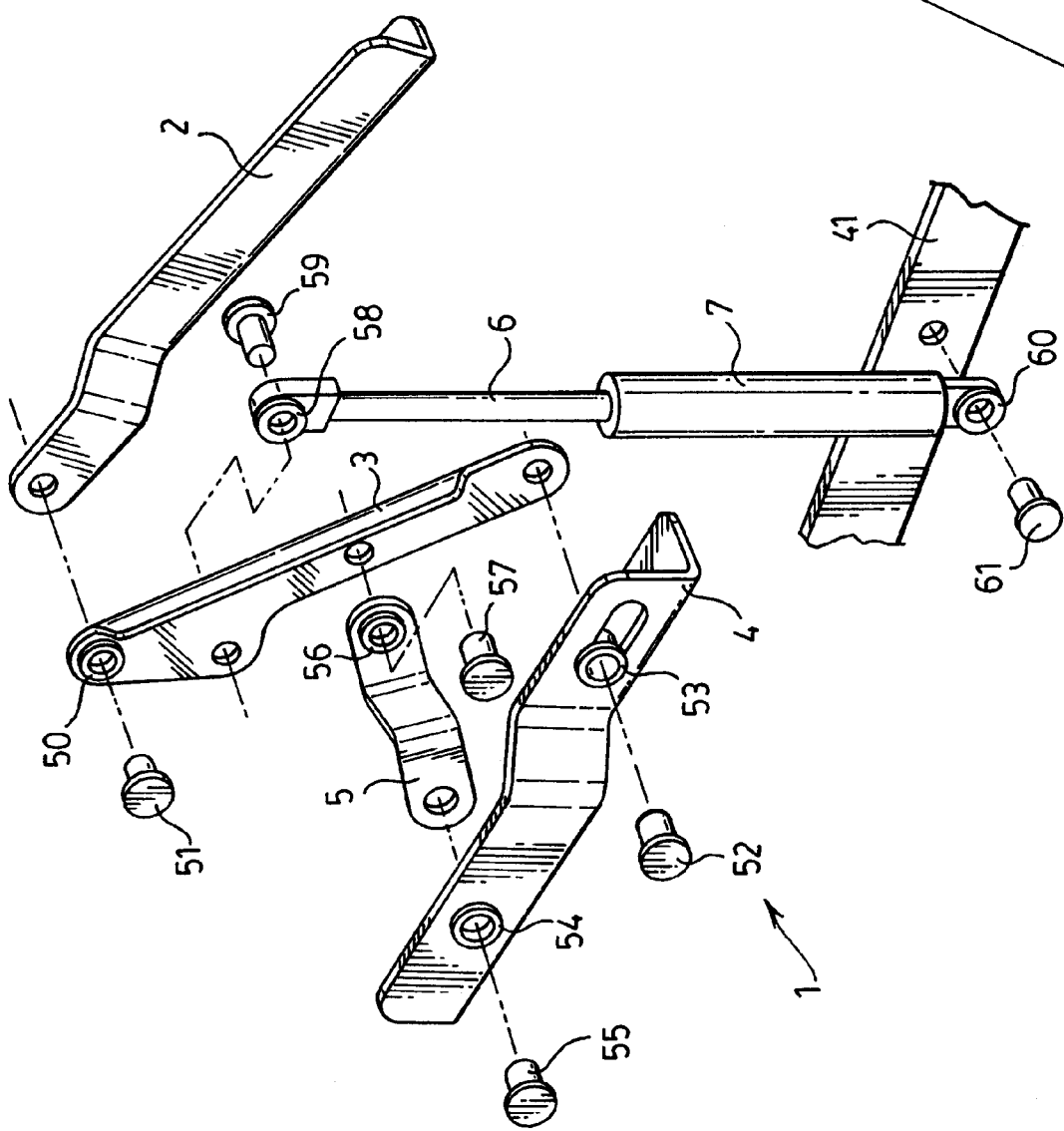
FIG. 4 is an exploded perspective view of the components of one embodiment of the inventive hinge assembly.

Referring to FIGS. 2, 3 and 6, when the hinge assembly (1) is in a deployed state, the geometric configuration of the main link component (3), hood component (2), body component (4) and control link (5) provides an extremely rigid structure in all degrees of freedom except the predetermined motion path required for pedestrian energy dissipation. As the predetermined motion path is in a generally vertical direction, this rigid structure is capable of restraining the vehicle hood (40) from moving rearward in the case of a severe frontal impact. The rigid structure of the present invention therefore prevents the vehicle hood (40) from being driven back through the vehicle windshield (42) and injuring the vehicle occupants in the case of a substantial frontal impact.

Figure 7:
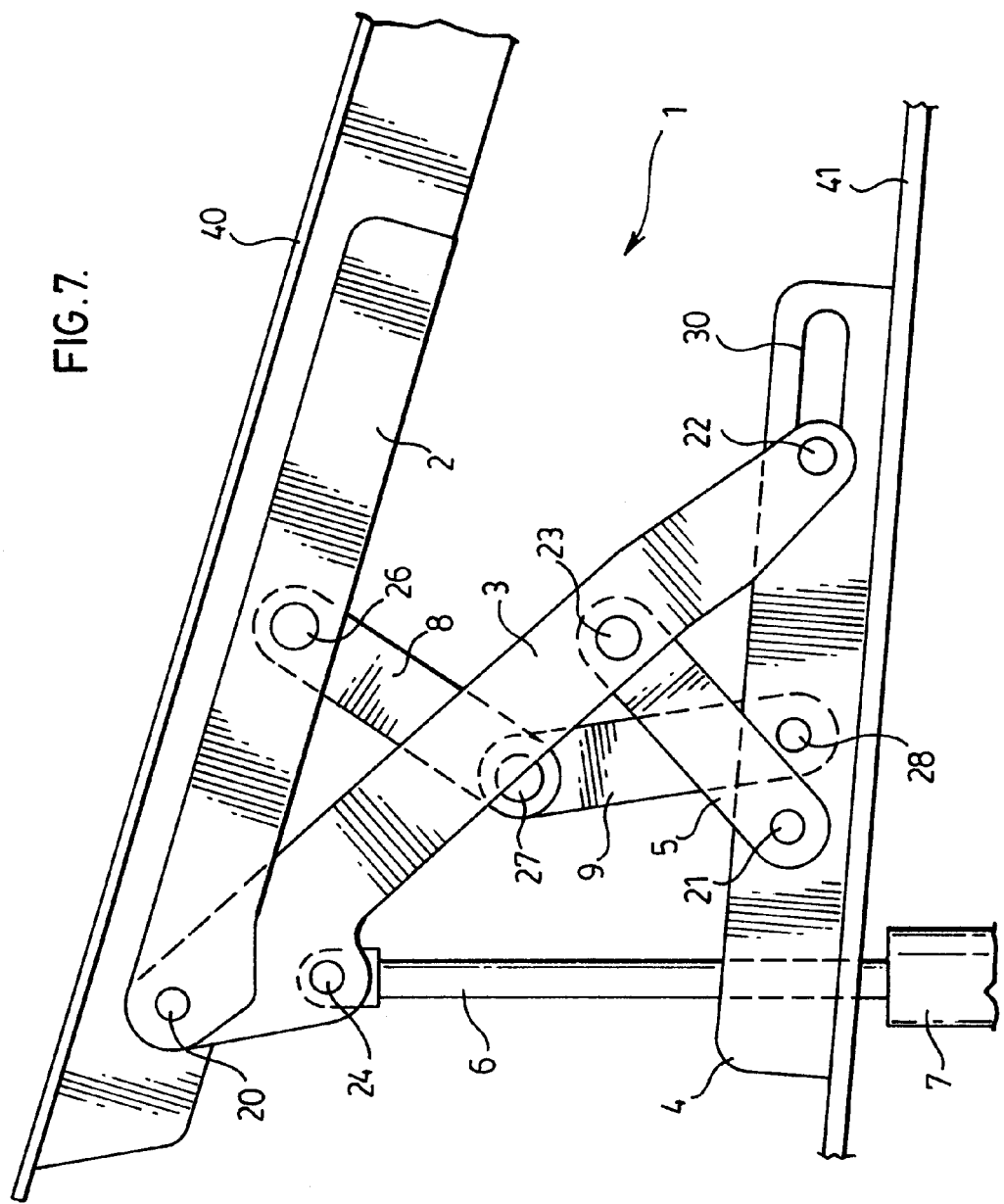
FIG. 7 is a side view of a preferred alternative embodiment of the inventive hood hinge assembly in a fully deployed position due to a pedestrian collision.
Figure 8:
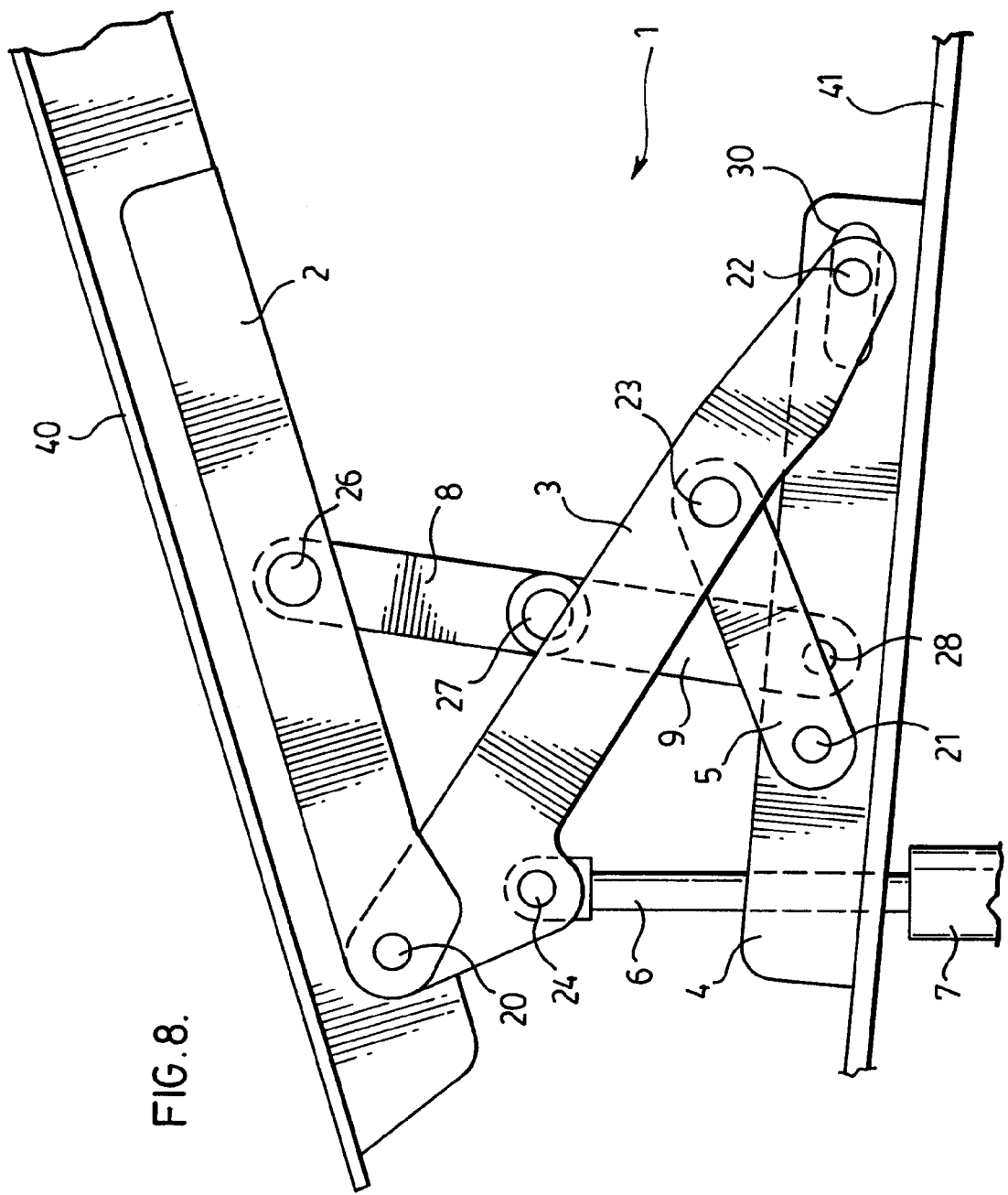
FIG. 8 is a side view of a preferred alternative embodiment of the inventive hood hinge assembly in an intermediate position during reset from a fully deployed position to a retracted position.

An additional preferred embodiment of the present invention is illustrated in FIGS. 7 and 8 which facilitates simple vehicle operator resetting of the system from a deployed state to a retracted state. This reset mechanism is added to the previously described hood hinge assembly (1) and is constructed from an upper reset link (8) and a lower reset link (9).

Each reset link is configured with two pivot joints, located at each of its two ends. The upper reset link (8) is adapted to be rotatably attached to the hood component (2) at an upper reset pivot joint (26) via a bushing and rivet or similar means. The upper reset link (8) is also adapted to be rotatably attached to the lower reset link (9) at an intermediate reset pivot joint (27) via a bushing and rivet or similar means. The lower reset link (9) is adapted to be rotatably attached to the body component (4) at a lower reset pivot joint (28) via a bushing and rivet or similar means. With the hood hinge assembly (1) in a retracted state and operating in a conventional single pivot configuration, the upper reset link (8) and lower reset link (9) move in a totally passive manner and do not affect the motion of the hood hinge assembly (1).

When the hood hinge assembly (1) is moving from a retracted state to a deployed state as would occur due to a collision with a pedestrian, the upper reset link (8) and lower reset link (9) move in a totally passive manner and do not affect the motion of the hood hinge assembly (1). When the hood hinge assembly (1) is in a deployed state and the vehicle operator releases the front mounted hood catch (43) and rotates the vehicle hood (40) from a front edge fully closed to a front edge fully open position around the main pivot joint (20), then the upper reset link (8) and the lower reset link (9) are rotated into an orientation that allows them to act as a single tension member. This forces the moving element (6) of the energy storage actuator (7) to be compressed back into its retracted position so that it relatches. This motion is similar to the conventional opening and closing operation of the hood but it is undertaken when the moving element (6) of the energy storage actuator (7) is in its deployed position. This provides the vehicle operator with a simple and intuitive method of resetting the system after deployment.

Figure 10:
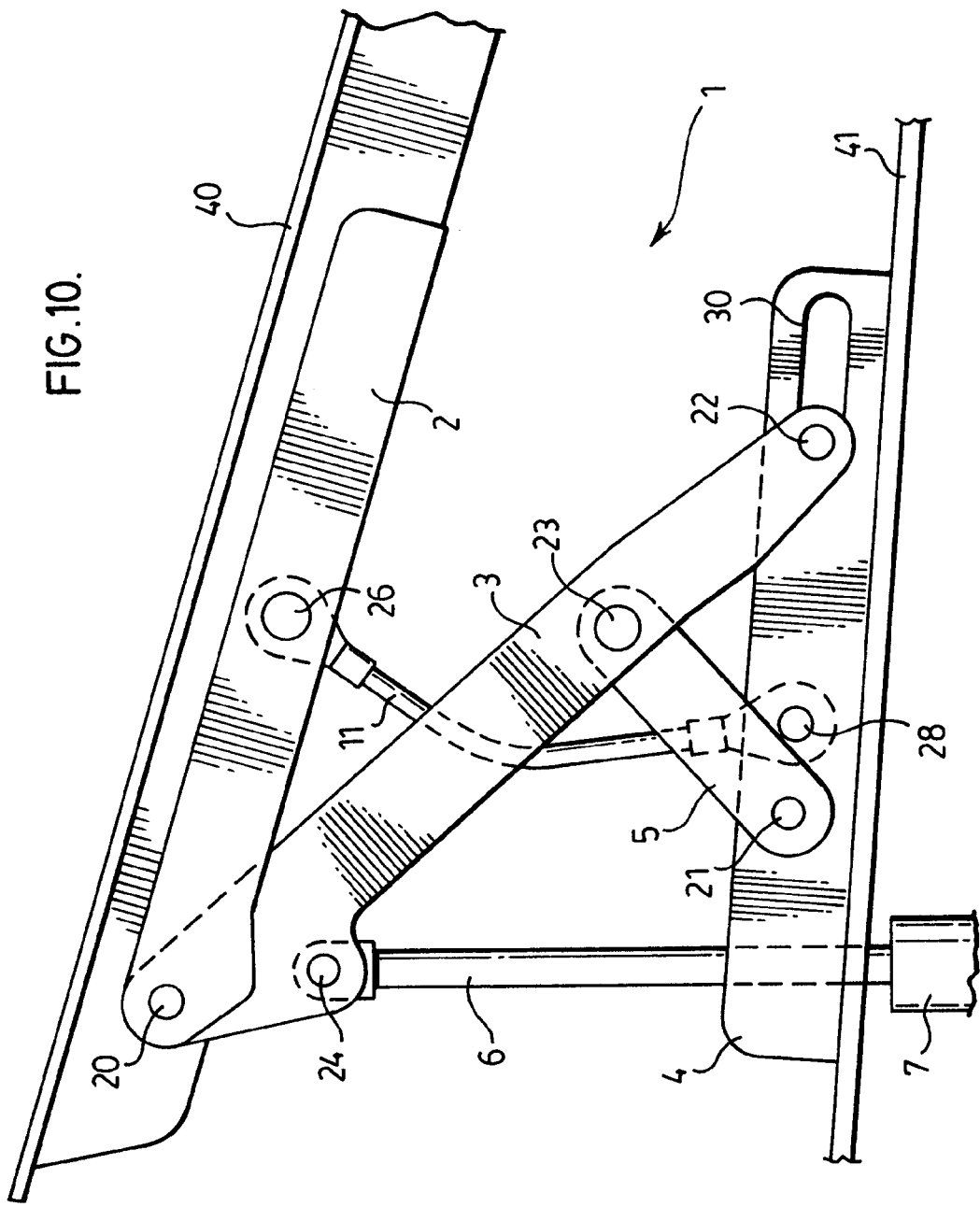
FIG. 10 is a side view of an alternative embodiment of the inventive hood hinge assembly in a fully deployed position due to a pedestrian collision.

FIG. 10 illustrates an alternative embodiment of the reset linkage configured with a single flexible cable (11) that is rotatably attached to the body component (4) at a lower reset pivot joint (28) via a bushing and rivet or similar means, and is also rotatably attached to the hood component (2) at an upper reset pivot joint (26) via a bushing and rivet or similar means. This cable replaces the two reset links (8)(9) but operates in an identical manner.

The embodiments of the invention in which an exclusive property or privilege is claimed are defined as follows:

1. An automotive hood hinge assembly adapted to act as a safety device in the event of a collision with a pedestrian, comprising:
   a) A hood component adapted to be mounted to a vehicle hood;
   b) A body component adapted to be mounted to a vehicle body structure;
   c) A main link component adapted to be connected between the hood component and the body component via a first rotatable joint on the hood component and a second rotatable joint guided by a slot on the body component;
   d) A control link adapted to be connected between the body component and the main link component via third and fourth rotatable joints;
   e) A moving element of an energy storage actuator adapted to be rotatably attached to the main link component adjacent the hood component first rotatable joint;
   such that in the event of a collision with a pedestrian, a sensor and control system provide a trigger signal to the energy storage actuator which deploys the moving element and translates the main link component and hood component in a primarily vertical motion dictated by the control link and body component slot geometry so that when a pedestrian's head and upper body strike the raised vehicle hood the energy storage actuator provides a resistive force capable of effectively dissipating the pedestrian's energy in a controlled manner so that trauma levels are significantly lowered.

2. The automotive hood hinge assembly of claim 1, wherein the slot on the body component and the geometry of the control link are configured to facilitate conventional rotary opening and closing operation of the vehicle hood around a single pivot when the moving element is fully retracted.

3. The automotive hood hinge assembly of claim 1, wherein the slot on the body component and the geometry of the control link are configured to interact with the main link component and hood component to provide an extremely rigid structure when the moving element is deployed so that the hood hinge assembly prevents the vehicle hood from being driven back through the windshield in the case of a substantial frontal impact.

4. The automotive hood hinge assembly of claim 1, wherein the energy storage actuator is configured with an internal latch that retains the moving element in a fully retracted position but wherein said latch can be released in response to an electrical trigger signal so that the moving element is deployed a predetermined linear displacement and can then be relatched by compressing the moving element back into a fully retracted position.

5. The automotive hood hinge assembly of claim 1, wherein the energy storage actuator is a gas spring, the pressure and internal components of which are tuned to return both a required deployment rate and a resistive force capable of effectively dissipating the pedestrian's energy in a controlled manner.

6. The automotive hood hinge assembly of claim 1, wherein the energy storage actuator is a coil spring that is tuned to return both a required deployment rate and a resistive force capable of effectively dissipating the pedestrian's energy in a controlled manner.

7. The automotive hood hinge assembly of claim 1, wherein a reset linkage is provided that comprises two links adapted to be connected between the hood component and the body component to allow normal operation of the hood hinge assembly in both a conventional single pivot operation and during deployment in the event of a collision with a pedestrian but wherein said links force the moving element of the energy storage actuator to be compressed back into its retracted position when the vehicle operator rotates the vehicle hood from fully closed to fully open when the hood hinge assembly is in the deployed position.

8. The automotive hood hinge assembly of claim 1, wherein a reset arrangement is provided that comprises a cable adapted to be connected between the hood component and the body component allowing normal operation of the hood hinge assembly in both a conventional single pivot operation and during deployment in the event of a collision with a pedestrian but that forces the moving element of the energy storage actuator to be compressed back into its retracted position when the vehicle operator rotates the vehicle hood from fully closed to fully open when the hood hinge assembly is in the deployed position.

9. An automotive hood hinge assembly adapted to act as a safety device in the event of a collision with a pedestrian, comprising:
   a) A hood component adapted to be mounted to a vehicle hood;
   b) A body component adapted to be mounted to a vehicle body structure;

c) A main link component adapted to be connected between the hood component and the body component via a first rotatable joint on the hood component and a second rotatable joint guided by a slot on the body component;
d) A control link adapted to be connected between the body component and the main link component via third and fourth rotatable joints;
e) A moving element of an energy storage actuator adapted to be rotatably attached to the main link component adjacent the hood component first rotatable joint;
f) A reset linkage consisting of two reset links adapted to be rotatably attached to each other and to be connected between the hood component and the body component via fifth and sixth and seventh rotatable joints;

such that in the event of a collision with a pedestrian, a sensor and control system provide a trigger signal to the energy storage actuator which deploys the moving element and translates the main link component and hood component in a primarily vertical motion dictated by the control link and body component slot geometry so that when a pedestrian's head and upper body strike the raised vehicle hood the energy storage actuator provides a resistive force capable of effectively dissipating the pedestrian's energy in a controlled manner so that trauma levels are significantly lowered; and the reset linkage acts passively to allow deployment of the hood hinge assembly but is adapted to force the moving element of the energy storage actuator to be compressed back into its retracted position when the vehicle operator rotates the vehicle hood from fully closed to fully open when the hood hinge assembly is in the deployed state.

10. The automotive hood hinge assembly of claim 9, wherein the slot on the body component and the geometry of the control link are configured to facilitate conventional rotary opening and closing operation of the vehicle hood around a single pivot when the moving element is fully retracted.

11. The automotive hood hinge assembly of claim 9, wherein the slot on the body component and the geometry of the control link are configured to interact with the main link component and hood component to provide an extremely rigid structure when the moving element is deployed so that the hood hinge assembly prevents the vehicle hood from being driven back through the windshield in the case of a substantial frontal impact.

12. The automotive hood hinge assembly of claim 9, wherein the energy storage actuator is configured with an internal latch that retains the moving element in a fully retracted position but wherein said latch can be released in response to an electrical trigger signal so that the moving element is deployed a predetermined linear displacement and can then be relatched by compressing the moving element back into a fully retracted position.

13. The automotive hood hinge assembly of claim 9, wherein the energy storage actuator is a gas spring, the pressure and internal components of which are tuned to return both a required deployment rate and a resistive force capable of effectively dissipating the pedestrian's energy in a controlled manner.

14. The automotive hood hinge assembly of claim 9, wherein the energy storage actuator is a coil spring that is tuned to return both a required deployment rate and a resistive force capable of effectively dissipating the pedestrian's energy in a controlled manner.

* * * * *